Oct. 16, 1934.    P. LANDROCK    1,977,000
CARD CUTTING APPARATUS
Filed Oct. 10, 1932    6 Sheets-Sheet 1

INVENTOR
Paul Landrock
BY Edward H. Cumpston
his ATTORNEY Patented Oct. 16, 1934

1,977,000

UNITED STATES PATENT OFFICE 1,977,000

CARD CUTTING APPARATUS

Paul Landrock, Rochester, N. Y., assignor to Photostat Corporation, Providence, R. I., a corporation of Rhode Island Application October 10, 1932, Serial No. 636,967

8 Claims. (Cl. 164—15)

This invention relates to card cutting apparatus. An object of the invention is the provision of improved and simplified apparatus of a compact nature, easy to operate, and capable of cutting cards from stock in an efficient manner.

Another object of the invention is the provision of improved means for guiding and positioning the stock to be cut.

Still another object is the provision of improved means for holding the cards after they are cut, which means is designed to keep the cards conveniently alined with each other so that they may be handled rapidly without the necessity of straightening a jumbled pile of cards.

A further object is the provision of simple means for punching the cards.

A still further object is the provision of simple and effective power mechanism for operating the cutting and punching means.

To these and other ends the invention resides in certain improvements and combinations of parts, all as will be hereinafter more fully described, the novel features being pointed out in the claims at the end of the specification.

In the drawings.

The same reference numerals throughout the several views indicate the same parts.

While capable also of other uses, the apparatus of the present invention is particularly adapted for cutting successive cards from a strip of stock which preferably has a width equal to one dimension of the cards, the strip of stock preferably being unwound from a roll during the cutting operation. The term "card" as used in this specification and the appended claims, is intended in a broad sense to designate any small piece of sheet material suitable, for example, for use in a catalogue or index, irrespective of whether such material is of the conventional card thickness or of any other thickness such, for instance, as ordinary paper thickness.

Figure 1:
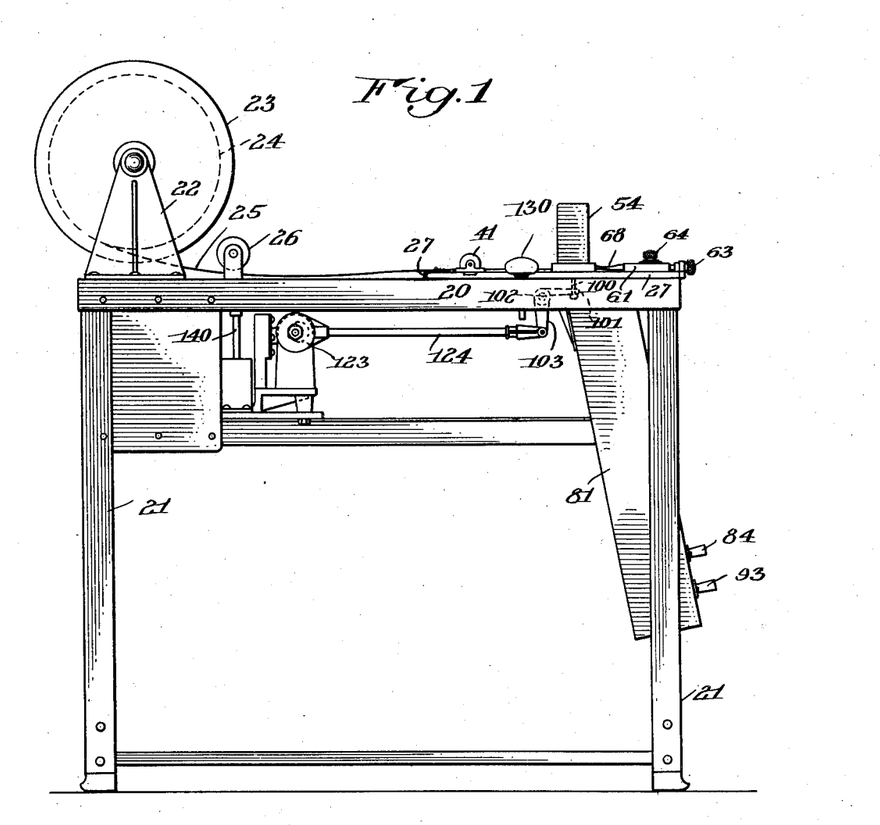
Fig. 1 is a front elevation of apparatus constructed in accordance with a preferred embodiment of the invention.

The apparatus of the present invention comprises, as shown especially in Fig. 1, a table 20 supported by suitable legs 21, the table carrying near its left hand end a pair of brackets 22 for holding a reel 23 carrying a roll 24 of sheet material or stock 25 from which the cards are to be cut. The stock 25, as it is unwound from the roll, is carried under a guide roller 26 and thence rightwardly over the table and over a mounting plate 27 placed on the table near its right hand end.

Figure 6:
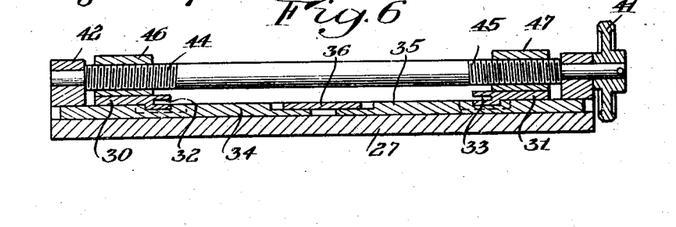
Fig. 6 is a transverse vertical section taken substantially on the line 6—6 of Fig. 5.
Figure 7:
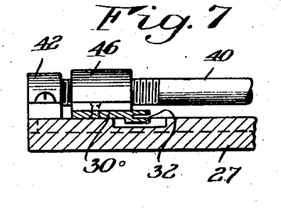
Fig. 7 is a similar section taken substantially on the line 7—7 of Fig. 5.

This mounting plate 27 carries guide means engaging the edges of the strip of stock 25 to hold this stock laterally and guide it into proper cooperative relationship to the severing mechanism hereafter described. The guiding means, as shown particularly in Figs. 5, 6 and 7, may comprise, for example, side plates 30 and 31, having grooves 32 and 33 respectively in their inner edges for embracing the side edges of the stock, the bottom of each groove being substantially flush with the top of the plate 27, as shown in Fig. 7, so that the strip of stock when received in these grooves will lie flat on the plate 27. The guide plates 30 and 31 preferably also have plates 34 and 35 respectively, rigidly attached to them, extending transversely across the mounting plate 27 and slidably received in a groove in the mounting plate. The inner ends of the plates 34 and 35 may be held down in their grooves by a plate 36 secured to and having its top surface substantially flush with the mounting plate 27. The plates 34 and 35 thus act as guides for the guiding plates 30 and 31 and hold the guiding plates at all times parallel with each other although permitting them to move back and forth toward and away from each other in order to adjust the distance between the guide plates.

For moving the guide plates in this transverse direction, any suitable adjusting means may be provided. For example, a shaft 40 having a hand wheel 41 thereon may be mounted in bearings 42 on the plate 27, and is provided with left hand and right hand screw threads 44 and 45 respectively, engaging correspondingly threaded apertures in blocks 46 and 47 respectively, secured to the respective guide plates 30 and 31. Thus by turning the hand wheel 41 to rotate the shaft 40 in one direction, the guide plates 30 and 31 are adjusted toward each other, while by rotating the shaft 40 in the opposite direction the guide plates are adjusted away from each other. In this manner the lateral guides for the strip of stock may be made to accommodate slightly varying widths of stock.

A little to the right of the lateral guides 30 and 31 the mounting plate 27 is provided with an opening 50 of substantial size sufficient so that a severed card may drop through the opening. Adjacent the left hand edge of this opening is a removable and renewable plate 51 forming an abutment or shearing edge for cooperation with a severing mechanism such as the shearing knife 52 (Figs. 4 and 10) mounted for vertical movement in suitable guideways 53 within a casing 54, and normally urged upwardly by springs 55. The strip of stock 25 after passing through the guiding grooves 32 and 33, passes under a guiding plate 56 spaced slightly above the mounting plate 27 and thence over the abutment 51 and projects from this point over the opening 50. Consequently, when the knife 52 is depressed, the stock 25 is cut by the cooperating parts 51 and 52, and the cut piece of stock or card is free to fall through the opening 50.

Suitable means is provided for determining the extent to which the stock projects beyond the severing element 51, in order to determine the dimension in one direction of the card to be cut by the severing mechanism. This means may comprise, for example, the abutment plate 60 (Figs. 4 and 5) slidable longitudinally in guideways 61 secured to the mounting plate 27, and controlled in its movements by an adjusting screw 62 operated by a knurled knob 63. A clamping screw 64 may be tightened to hold the plate 60 in any position to which it has been adjusted.

Figure 4:
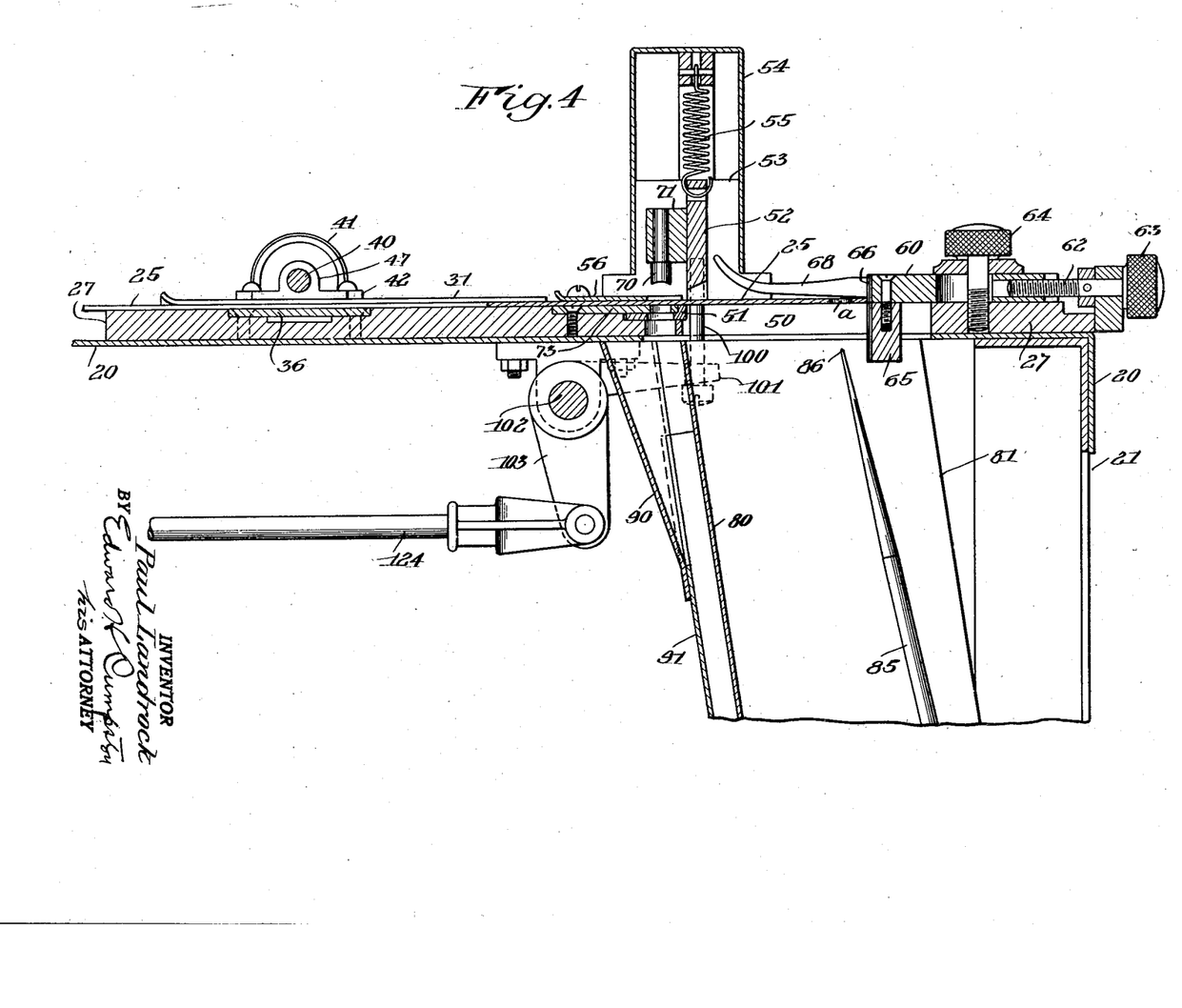
Fig. 4 is a vertical section taken substantially centrally through part of the apparatus shown in Fig. 1.
Figure 5:
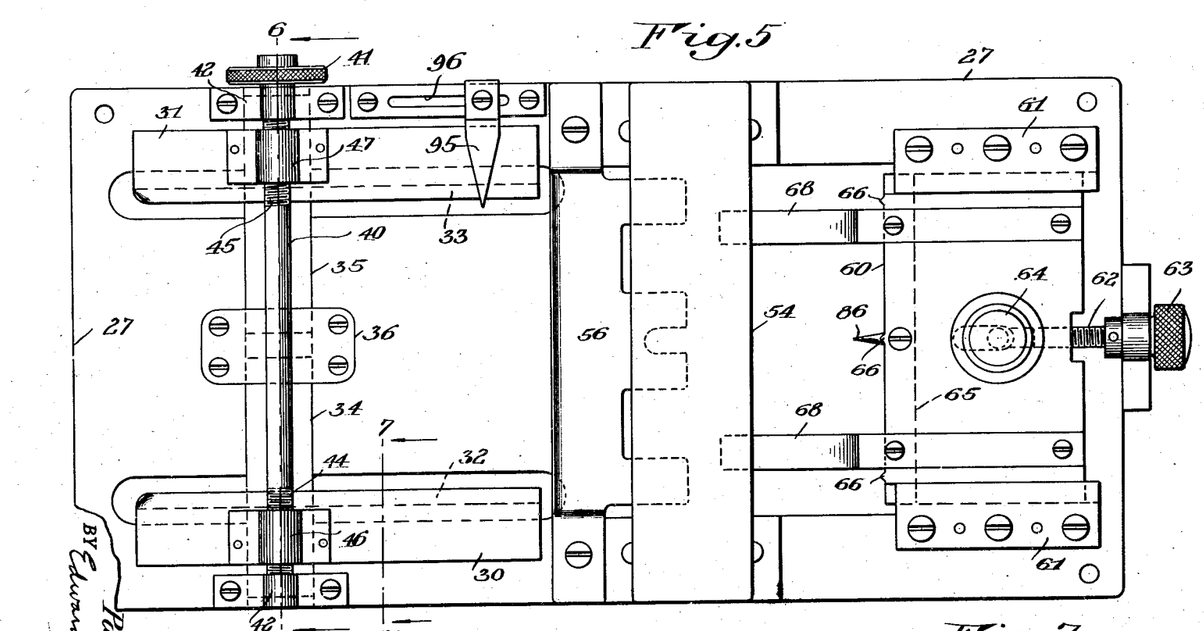
Fig. 5 is a plan of part of the apparatus shown in Fig. 1.

A bar 65 is secured to the under side of the plate 60 along the left hand edge thereof, as plainly shown in Figs. 4 and 5, with the left hand edge of the bar flush with the left hand edge of the plate 60. These left hand edges together form an abutment against which the right hand edge of the card stock may be positioned in order to determine the dimension of the card to be cut from the stock.

Preferably the abutment edges of the members 60 and 65 are not perfectly smooth but are provided with a plurality of vertically extending ribs 66, three such ribs being shown in Fig. 5. The edge of the card stock then abuts only against the projecting edges of these ribs and does not contact with the flat faces of the members 60 and 65 throughout any substantial area, so that any tendency which the card stock might have to stick to flat surfaces is eliminated or greatly reduced. Furthermore, any slight irregularities or accidental projection of a few fibers from the edge of the card stock would not prevent the edge from coming into firm contact with the abutment ribs 66, so that accurate cutting of cards to the predetermined desired dimension is insured.

In unwinding the strip of stock from the roll 24, it is preferably unwound from the bottom of the roll as shown in Fig. 1 so that if the stock has any tendency to curl because of having been wound on the roll, its free end will curl upwardly rather than downwardly. Guiding fingers 68 (Figs. 4 and 5) are secured to the plate 60 and extend over the normal position of the stock as plainly shown in Fig. 4, so that the portion of the stock which projects beyond the severing knife is held in the desired flat position for proper cooperation with the abutment ribs 66. The left hand ends of the fingers 68 are curved upwardly as shown, to engage and depress any projecting end of the stock as it is advanced rightwardly during operation.

In many instances it is desired that index cards should be punched with holes or slots for cooperation with rods or other locking devices in the drawers or cabinets in which the cards are to be kept, to prevent accidental or unauthorized removal of the cards from the cabinets. The present invention provides simple and effective means for punching the cards in any desired manner, preferably with the conventional hole for cooperation with a rod in the card drawer. The punching mechanism is preferably so designed that it will punch a hole, concurrently with a cutting operation, in the area from which the next card is to be cut. Thus when any given card is actually severed from the strip of stock, it already has its hole punched therein, which fact is used in guiding and holding the severed cards as hereafter described.

Figure 2:
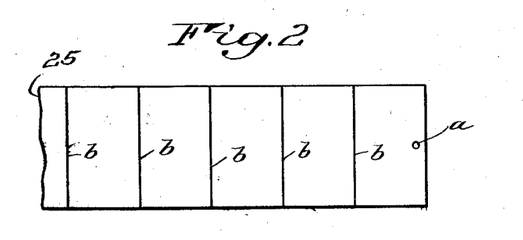
Fig. 2 is a plan of a strip of stock showing the manner in which it is cut to form individual cards.
Figure 3:
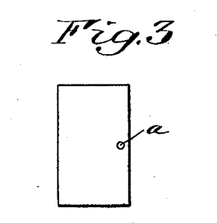
Fig. 3 is a plan of an individual card cut from such a strip of stock.

Referring now to the diagram of Fig. 2, a strip of stock is shown at 25, and a hole punched in the stock in the area from which the next card is to be cut is indicated at $a$. To form individual cards the strip may be severed along the lines indicated at $b$. If matter has already been printed on the strip of stock, photographically or otherwise, the division lines $b$ will ordinarily show or be suitably indicated on the stock. The first or right hand cut along the line $b$ will sever an already punched card, such an individual severed card being shown in Fig. 3. At each severing operation along the successive lines $b$ of Fig. 2, the desired hole is preferably punched in the area of the next adjacent card to the left, so that the end of the strip from which the card is to be cut always has the required hole therein.

The means for accomplishing this punching is best shown in Fig. 4 of the drawings. A punching element 70 is mounted on a bracket 71 rigidly secured to the knife blade 52 so that the punching member 70 is operated at each reciprocation of the knife blade. On the downward movement of the knife blade the punching element 70 moves downwardly through the card stock 25 and into a suitable cooperating opening in a removable and replaceable plate 73 secured to the mounting plate 27. Thus, at each cut made by the severing knife 52, the desired hole is punched in the stock slightly to the left of the cut. Obviously, the shape, size, and position of the hole to be punched in the stock may be varied at will, in accordance with the requirements of the particular interlocking means in the card drawers with which this hole is to cooperate.

Figure 8:
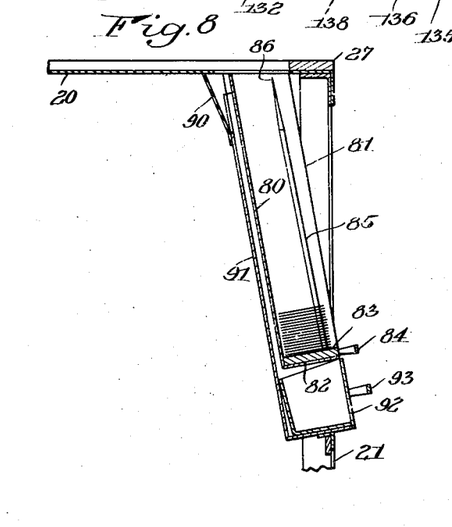
Fig. 8 is a vertical section taken substantially centrally through the parts for receiving and holding cards and punchings.
Figure 9:
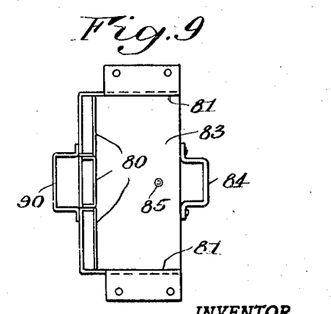
Fig. 9 is a plan of the parts shown in Fig. 8.

Immediately beneath the opening 50 through which the severed card falls on being severed, there is a compartment for receiving the severed cards, which compartment has a back wall 80, side walls 81, a bottom 82 and an open front, as illustrated particularly in Figs. 4, 8 and 9. In guiding the cards during their fall and holding successive cards in alined position, advantage is taken of the fact that each card when severed has a hole punched therein. A support 83 having a handle 84 is removably placed on the bottom 82 of the card receiving compartment and is provided with an upwardly extending pin or rod 85 having a point 86 normally positioned directly beneath and a slight distance below the hole in the card being severed from the stock.

When the severing of the card is completed, it begins to fall vertically downwardly through the opening 50, and substantially immediately it is caught and impaled on the pin or rod 85. The card then slides down the rod until it comes to rest on the member 83 or on a stack of cards previously accumulated on the rod. The rod thus holds the cards substantially in alinement with each other, assisted by the back wall 80 of the compartment, which prevents the cards from turning to any substantial extent on the rod. When a sufficient stack of cards is accumulated on the rod 85, the member 83 is removed by the handle 84, the rod 85 and the entire stack of cards being removed with it, the cards are taken from the rod, and the member 83 is replaced in the card compartment so that the rod is ready to receive more cards.

The punchings cut from the cards fall down a chute whose front wall is formed by the rear wall 80 of the card compartment and whose rear wall is formed by portions 90 and 91, and into a suitable receptacle beneath the card compartment such as the removable drawer 92 having a handle 93 by which the drawer may be removed and emptied when it becomes full of accumulated punchings.

A pointer 95 (Fig. 5) may be mounted for adjustment along a slot 96 on the plate 27, which pointer is useful in cutting the cards properly, and particularly in cutting the first card of each strip. For instance, where matter has already been printed, photographically or otherwise, on the roll of stock which is to be cut up into the cards, it is important that the cuts between successive cards shall come at the desired predetermined point with relation to the matter printed on the stock. The pointer 95 may be adjusted, for example, so that when it is opposite a division line b (Fig. 2) or other predetermined point with relation to the printed matter, the cut will be made exactly at the next division line b to the right. Once the cutting of the strip has been properly started, the subsequent cuts should all be in proper position if the abutment plate 60 has been correctly adjusted, but the cutting of the cards may be checked from time to time as the cutting of a long strip progresses by noting whether or not the pointer 95 still points to the proper predetermined position on successive cards brought under it.

Any suitable means may be provided for operating the severing and punching mechanism. For instance, the knife 52 may have studs 100 depending therefrom to a point below the table 20, and heads on these studs may be engaged by a pair of substantially horizontal forked arms 101 fixed to a shaft 102 mounted in suitable bearings on the under side of the table 20. The shaft has also an arm 103 fixed to it, which may be moved leftwardly in any suitable manner to cause clockwise rotation of the shaft 102 and consequent downward movement of the forked arms 101 pulling the severing knife 52 downwardly by means of the studs 100.

Preferably power means is provided for moving the shaft 102 in the manner above mentioned. This power means, according to a preferred embodiment, comprises a constantly running electric motor 105 (Figs. 10 and 12) operative, through suitable reducing gearing in the gear box 106, to cause constant rotation of a shaft 107 (Fig. 13) to which is fixed a clutch element 108 having a slot 109 therein. Another shaft 110 in axial alinement with the shaft 107 carries a clutch element 111 on which is mounted a pivoted dog 112, a spring 113 tending to move this dog into the slot 109 of the clutch element 108. The dog 112 is normally held out of engagement with the clutch element 108, however, by reason of the engagement of a tail on the dog with a control member 115 fixed to an arm 116 pivotally mounted at 117 and normally urged upwardly by a spring 118. When the free end of the arm 116 is depressed, the controlling member 115 is moved downwardly beneath the end of the tail on the dog 112 so that the spring 113 is able to move the dog against the rotating clutch element 108 and the dog will consequently engage in the notch 109 as soon as this notch comes opposite the dog during the rotation of the shaft 107. This position of the parts is illustrated in Fig. 14. The clutch element 111 will thus be coupled to the clutch element 108 by means of the dog 112, and the rotation of the element 108 will cause a corresponding rotation of the element 111 and its shaft 110 through one complete revolution.

Figure 13:
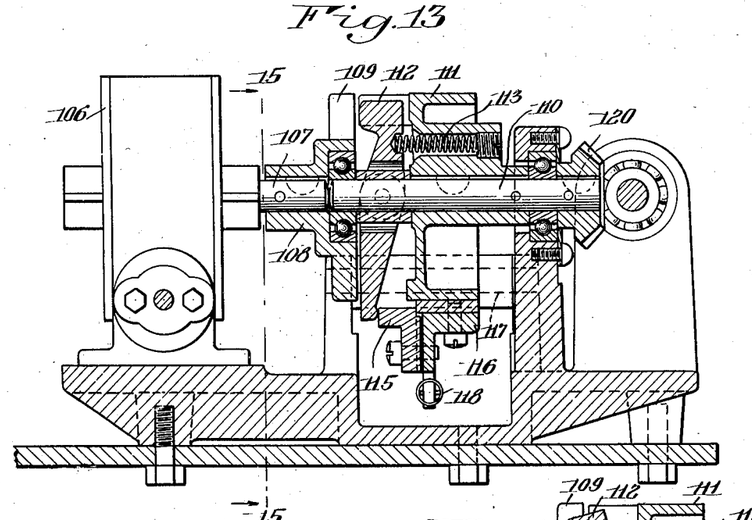
Fig. 13 is a vertical section taken longitudinally through the clutch for connecting the power means to the severing mechanism, with the clutch in open position.
Figure 14:
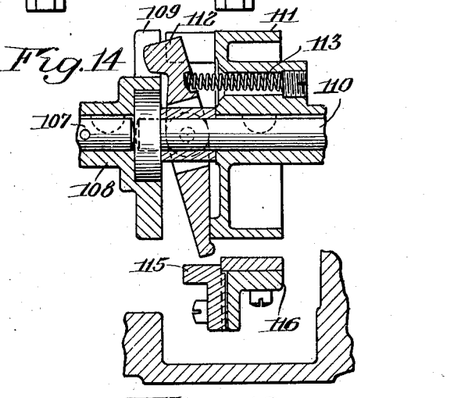
Fig. 14 is a similar section through a fragment of the clutch showing it in closed position.
Figure 15:
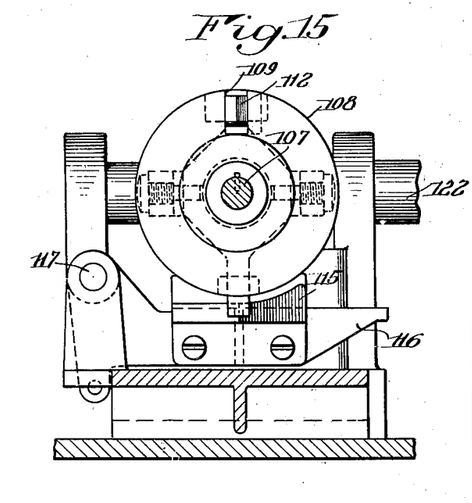
Fig. 15 is a vertical section taken substantially on the line 15—15 of Fig. 13.
Figure 16:
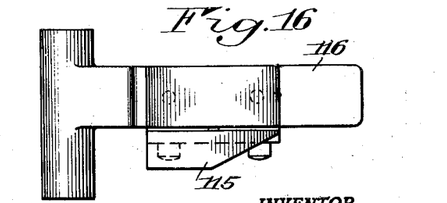
Fig. 16 is a plan of a clutch control arm.

At the end of one complete revolution, the arm 116 meanwhile having been released, the tail of the dog 112 moves into contact with an inclined cam surface of the control member 115, which cams the dog back to its disengaged position illustrated in Fig. 13, so that the rotation of the clutch element 111 and shaft 110 cease, notwithstanding continued rotation of the clutch element 108.

The rotation through a single revolution of the shaft 110 is effective, through beveled gears 120 and 121, to drive a shaft 122 through a single revolution, this shaft having thereon an eccentric which is engaged by the eccentric strap 123 connected by a link 124 to the lower end of the arm 103. The rotation through a single revolution of the eccentric on the shaft 122 draws leftwardly on the link 124, causing clockwise rotation of the shaft 102 and effective downward operation of the severing knife 52, followed by rightward movement of the link 124, counterclockwise rotation of the shaft 102, and upward movement of the severing knife under the influence of its springs 55.

Figure 10:
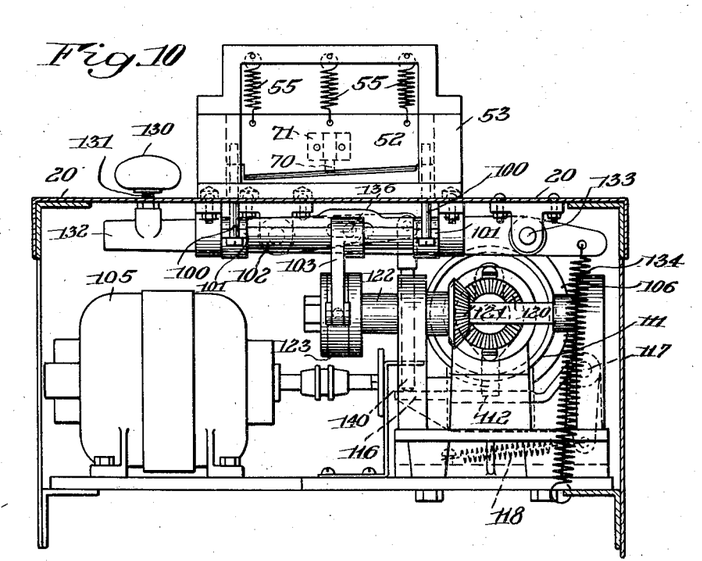
Fig. 10 is a transverse section through the apparatus, with parts omitted, showing especially the cutting mechanism and the power means for operating it.
Figure 11:
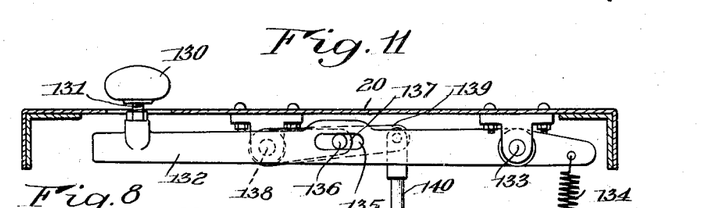
Fig. 11 is a view of certain of the parts shown in Fig. 10, with other parts omitted, in order to illustrate more clearly the control lever for tripping the power means.
Figure 12:
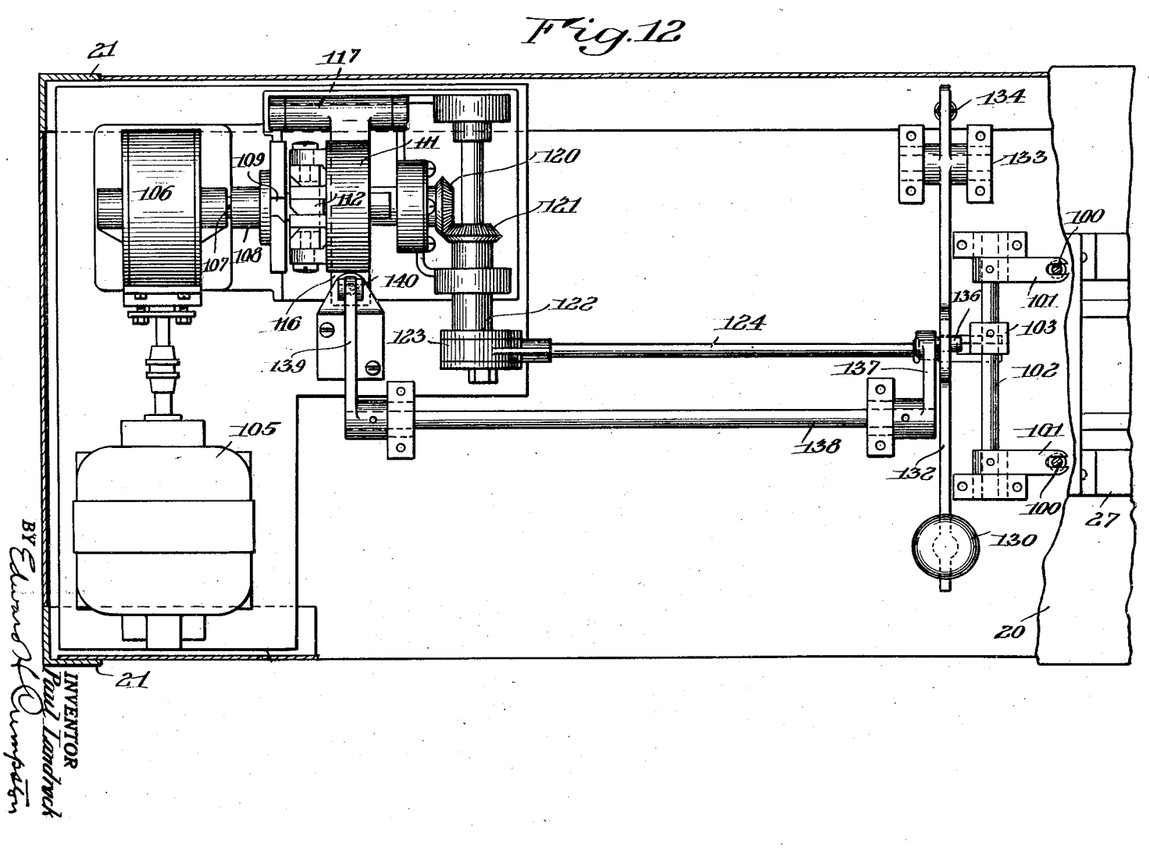
Fig. 12 is a plan of the power means and associated parts, with part of the casing shown in horizontal section.

The clutch controlling arm 116 may be tripped or depressed in any suitable manner, preferably by means conveniently accessible on the table near the severing mechanism. For example, as shown in Figs. 10–12, there may be a conveniently accessible knob 130 mounted on a stem 131 projecting upwardly through a slot in the table near the knife 52 and secured to an arm 132 pivoted at 133 and having a tail pulled downwardly by the spring 134 so that the knob 130 tends to remain at the upper limit of its motion. A slot 135 in the arm 132 is engaged by a pin 136 on an arm 137 fixed to a shaft 138, the opposite end of which shaft carries another arm 139 having secured thereto a plunger 140 (Fig. 10) overlying the free end of the clutch controlling arm 116. Consequently, depression of the knob 130, through the connections above described, will cause depression of the plunger 140 and a downward movement of the arm 116, releasing the clutch to cause a cutting operation.

It is believed that the operation of the various parts of the apparatus has been made clear by the foregoing description; but a brief outline of the operation as a whole will now be given. The strip of stock is unwound from the roll 24, passed under the guide roller 26, carried rightwardly along the top of the table, and fed through the slots 32 and 33 of the side guides 30 and 31, which are adjusted by the hand wheel 41 so as to grip the strip of stock closely without binding or impeding its movement. The end of the strip is placed in the proper position for the first cut with the aid of the pointer 95, if necessary, and the knob 130 is depressed to release the clutch dog 112 and to connect the clutch element 111 with the constantly rotating clutch element 108. The knob 130 may be immediately released after it has been momentarily depressed.

A single rotation of the clutch element 111 ensues, causing a single rotation of the shaft 122 and of the eccentric carried thereon. The single rotation of the eccentric moves the link 124 leftwardly and then rightwardly, pulling the knife 52 and punching element 70 downwardly and then releasing them for upward movement. This downward movement of the knife and punching element is effective to cut the strip of stock and to punch a hole in the strip adjacent the cut.

The strip of stock is then moved rightwardly by hand until the advancing edge thereof comes into contact with the abutment ribs 66 on the members 60 and 65, which may be adjusted to proper position by the screw 62. The advanced overhanging end of the strip of stock is held against any upward curling tendency which it might have, by means of the guiding fingers 68. When the edge of the stock is in contact with the abutment ribs 66, the stock is then in proper position to have the next cut made, which is done, as before, by a momentary depression of the knob 130.

The severed card then falls through the opening 50 in the table in such manner that the point 86 of the rod 85 enters the hole previously punched in the card, and the card thus becomes impaled on the rod 85, sliding down this rod to a position of rest on the member 83 or on top of any cards previously placed on this member. The strip of stock is again fed rightwardly until the advancing edge thereof comes into contact with the abutment ribs 66, and another cut is made, as before, by a momentary depression of the control knob 130. As each successive card is cut, it falls as before and becomes impaled on the rod 85, so that the cards accumulate on this rod and are held in proper alinement by it.

As each card is cut, a hole is punched adjacent the cut in that portion of the stock from which the next succeeding card will be cut, and the punchings fall down the chute formed by the walls 80, 90, and 91, and accumulate in the drawer 92, which may be removed for emptying when desired.

When sufficient cards have accumulated on the rod 85, the entire bunch of cards together with the rod and the support 83 are removed from the apparatus by means of the handle 84 and taken to any desired point.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Card cutting apparatus comprising a support, a knife mounted on said support, punching means mounted to move with said knife, means on said support for holding a roll of paper to be cut by said knife, abutment means spaced from said knife on the side thereof away from said roll for limiting the extent to which a strip of paper from said roll may project past said knife, laterally adjustable guide means mounted on said support between said roll holding means and said knife for guiding a strip of paper from said roll into proper position to be cut by said knife, power means for operating said severing mechanism, transmission means effective when moved to predetermined position to connect said power means to said knife to produce a single operation only of said knife, and control means conveniently accessible on said support adjacent said knife for moving said transmission means to said predetermined position to produce a single severing operation of said knife.

2. Paper cutting apparatus comprising means for punching a strip of paper and for severing successive portions from the strip, walls forming a compartment for receiving the severed portions of paper, a receptacle beneath said compartment for retaining punchings, and a chute adjacent said compartment for conveying punchings from said punching means to said receptacle.

3. Card cutting apparatus comprising a table having an opening therein, combined severing and punching mechanism mounted on said table adjacent one side of said opening for cutting cards from a strip of stock so that the cut cards may fall through said opening, adjustable abutment means adjacent the opposite side of said opening for controlling the extent to which said strip may project beyond said severing mechanism to determine the size of a card cut therefrom, power means beneath said table for operating said severing mechanism, and control means conveniently accessible on said table adjacent said severing mechanism for operatively connecting said power means to said severing mechanism for producing a single severing operation.

4. Card cutting apparatus comprising a support having an opening therein through which a card may fall, cutting means adjacent one side of said opening for severing a strip of card stock projected beyond said cutting means across said opening to cut a card therefrom, abutment means mounted on said support adjacent an opposite side of said opening for limiting the extent to which said strip may be projected beyond said cutting means and thus determining one dimension of the card to be severed from said strip, means for adjusting said abutment means toward and away from said cutting means to vary said dimension of the card to be severed, guiding means mounted on said abutment means and projecting toward said cutting means in a position overlying the strip of stock to be cut, and adjustable lateral guide means mounted on said support for guiding said strip into proper position to be cut by said cutting means.

5. Card cutting apparatus comprising a support having an opening therein through which a card may fall, cutting means adjacent one side of said opening for severing a strip of card stock projected beyond said cutting means across said opening to cut a card therefrom, abutment means mounted on said support adjacent an opposite side of said opening for limiting the extent to which said strip may be projected beyond said cutting means and thus determining one dimension of the card to be severed from said strip, means for adjusting said abutment means toward and away from said cutting means to vary said dimension of the card to be severed, guiding means mounted on said abutment means and projecting toward said cutting means in a position overlying the strip of stock to be cut, means on said support for holding a roll of card stock in position so that a strip of stock from said roll may be fed to said cutting means and projected across said opening under said guiding means and into contact with said abutment means, and adjustable lateral guide means for guiding said strip as it passes from said roll to said cutting means.

6. Card cutting apparatus comprising a support having an opening therein through which a card may fall, cutting means adjacent one side of said opening for severing a strip of card stock projected beyond said cutting means across said opening to cut a card therefrom, abutment means mounted on said support adjacent an opposite side of said opening for limiting the extent to which said strip may be projected beyond said cutting means and thus determining one dimension of the card to be severed from said strip, means for adjusting said abutment means toward and away from said cutting means to vary said dimension of the card to be severed, adjustable lateral guide means for guiding said strip of stock as it approaches said cutting means, and means operating concomitantly with said cutting means for punching a hole in a still unsevered part of said stock.

7. Card cutting apparatus comprising a support having an opening therein through which a card may fall, cutting means adjacent one side of said opening for severing a strip of card stock projected beyond said cutting means across said opening to cut a card therefrom, abutment means mounted on said support adjacent an opposite side of said opening for limiting the extent to which said strip may be projected beyond said cutting means and thus determining one dimension of the card to be severed from said strip, means for adjusting said abutment means toward and away from said cutting means to vary said dimension of the card to be severed, adjustable lateral guide means for guiding said strip of stock as it approaches said cutting means, means operating concomitantly with said cutting means for punching a hole in a still unsevered part of said stock in such position that each card when severed will have a hole therein, and an impaling pin extending upwardly to a free end pisitioned beneath the hole in a card about to be severed from said stock, so that when severed said card may fall onto said pin and said pin may enter said hole.

8. Card cutting apparatus comprising a support having an opening therein through which a card may fall, cutting means adjacent one side of said opening for severing a strip of card stock projected beyond said cutting means across said opening to cut a card therefrom, abutment means mounted on said support adjacent an opposite side of said opening for limiting the extent to which said strip may be projected beyond said cutting means and thus determining one dimension of the card to be severed from said strip, means for adjusting said abutment means toward and away from said cutting means to vary said dimension of the card to be severed, adjustable lateral guide means for guiding said strip of stock as it approaches said cutting means, means operating concomitantly with said cutting means for punching a hole in a still unsevered part of said stock in such position that each card when severed will have a hole therein, and an impaling pin extending upwardly to a free end positioned beneath the hole in a card about to be severed from said stock, so that when severed said card may fall onto said pin and said pin may enter said hole, said pin being of smaller diameter than said hole so that the severed card may slide readily by gravity down said pin.

PAUL LANDROCK.